Patented May 13, 1947

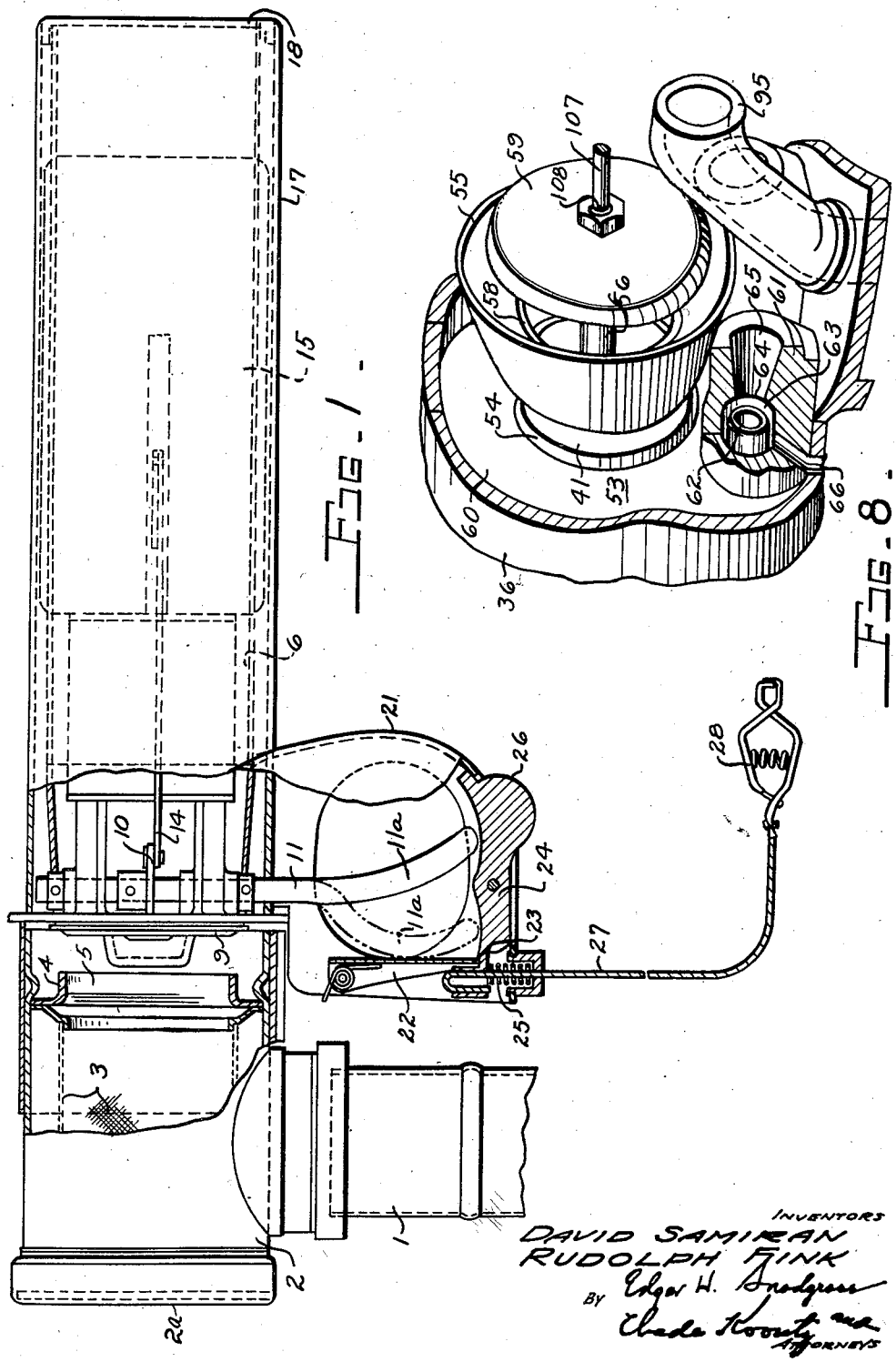

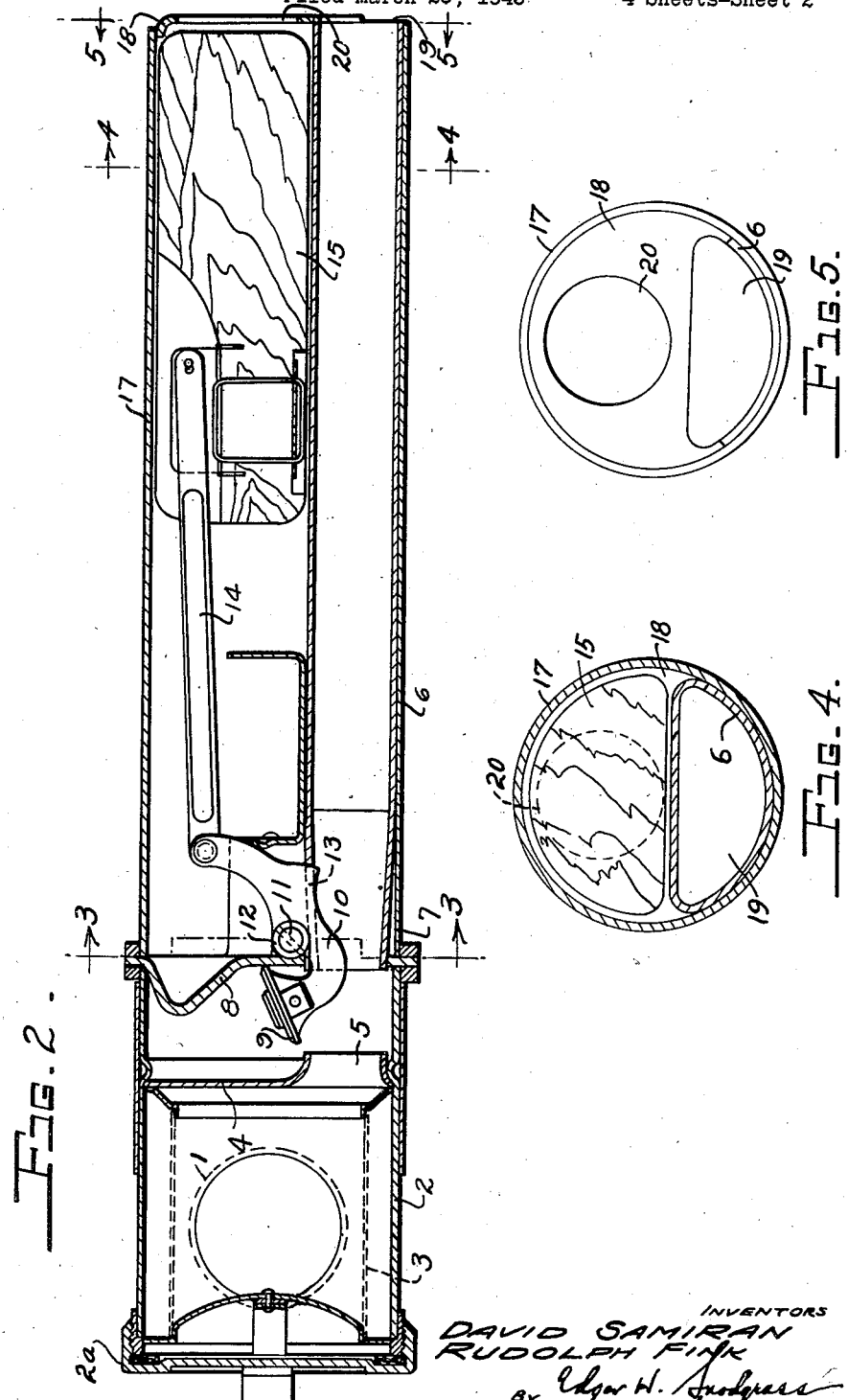

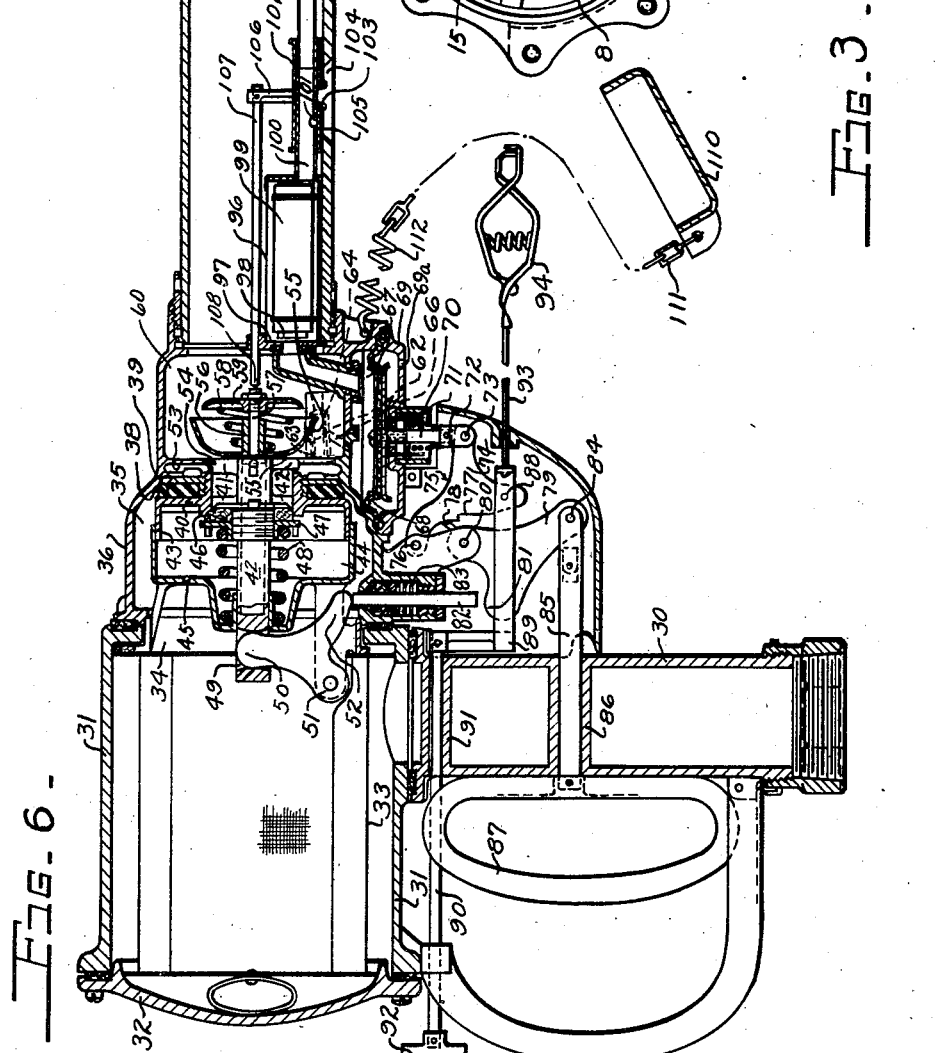

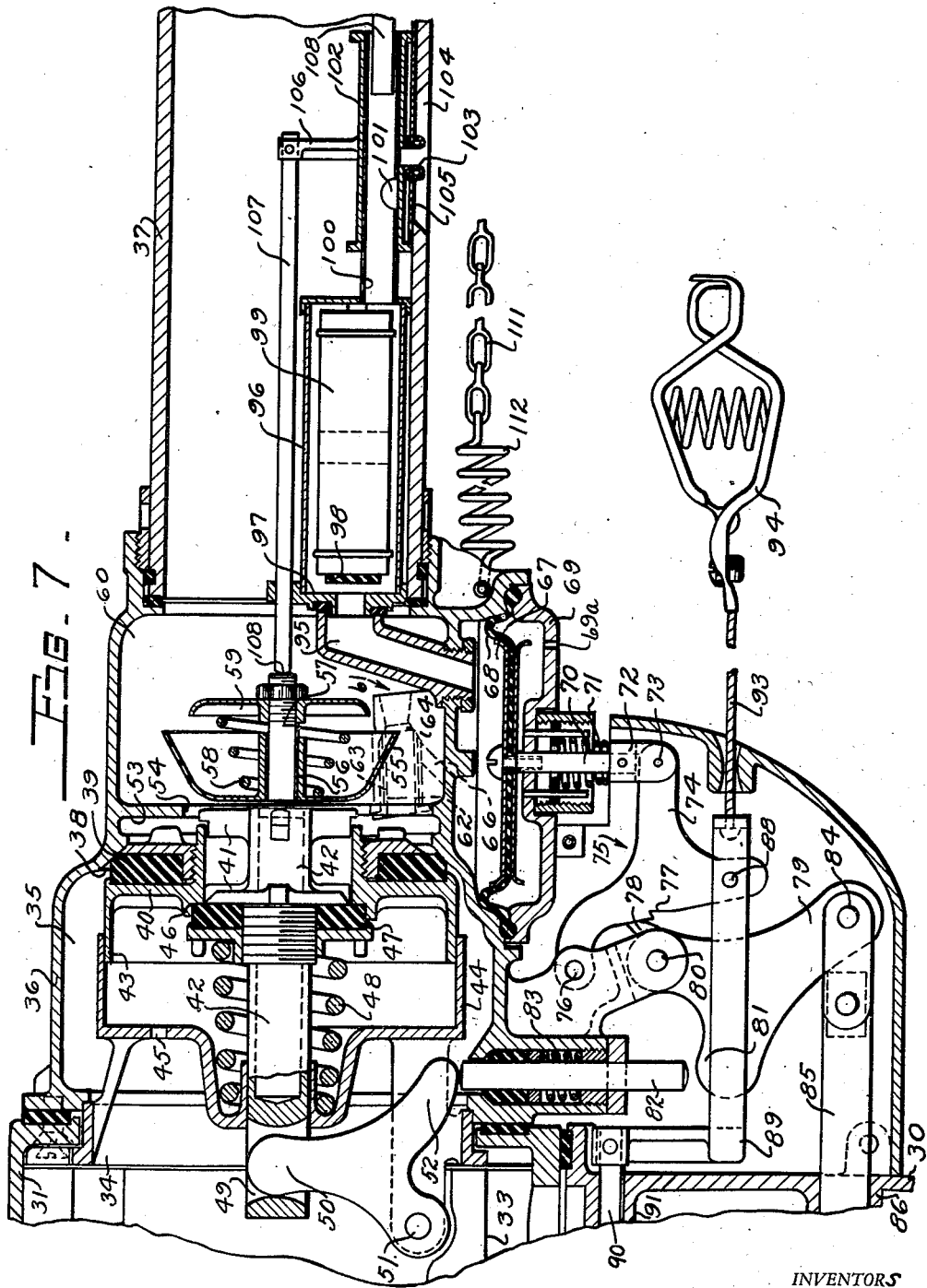

2,420,341

UNITED STATES PATENT OFFICE 2,420,341

AUTOMATIC SHUTOFF FUEL NOZZLE WITH FLOAT CONTROLLED VALVE

David Samiran, Osborn, and Rudolph Fink, Patterson Field, Ohio

Application March 23, 1943, Serial No. 480,162

12 Claims. (Cl. 226—127)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to improvements in automatic shut-off fuel nozzles such as to render the same suitable for filling aircraft fuel tanks without requiring the attention of the attendant other than to insert the nozzle into the tank filler neck and to initiate the flow through the nozzle, thereafter the nozzle automatically shutting off when the fuel reaches a predetermined level with respect to the nozzle outlet. The invention also incorporates certain novel features permitting the nozzles to be employed for very low rates of discharge, also permitting reverse flow through the nozzle to drain the pump and conduits connected thereto. The invention also incorporates certain safety features which insure automatic shut-off in the event that the nozzle should become dislodged from the filler neck of the tank in which it is inserted.

The present invention incorporates in the various modifications thereof, improvements in automatic shut-off nozzles which permit such nozzles to be employed in filling aircraft fuel or oil tanks and to effect a great saving in time, since one attendant may fill a large number of tanks simultaneously without further attention than to insert the nozzle in the tank and to open the valve of the same for delivery. In one form of the invention suitable for comparatively low delivery rates, the Venturi principle is employed to cause an automatic closing of the shut-off valve in the nozzle when the level of fuel in the tank or filler neck thereof reaches the level of the outlet of the nozzle, and a float member is employed to serve under high rates of delivery as a vacuum responsive piston member to assist in the closing of the valve, and under low rates of delivery, to serve as a float to positively close the valve by buoyant force exerted thereon by the rising level of fuel within a chamber associated with the nozzle.

In a further modification of the invention, the Venturi principle is employed to automatically operate the shut-off valve of the fuel nozzle under the control of a float member. The float member is employed to control the suction actuated valve mechanism to greatly augment the suction force available for operating the valve and insuring automatic operation of the fuel nozzle under low rates of flow.

It is therefore the principal object of the invention to provide an automatic shut-off fuel delivery nozzle assembly having a control valve therein automatically operated in response to the level of the fuel delivered from the nozzle into a container reaching the nozzle outlet, and incorporating means to insure the automatic closure of the valve under all flow conditions likely to be encountered in service.

It is a further object of the invention to provide a fuel nozzle for delivery of fuel into a container, and having valve means automatically operable to cut off delivery of the nozzle when the level of fuel in the container has reached a predetermined level with respect to the nozzle outlet, and said nozzle valve means being not only operative to automatically cut off the delivery of the nozzle but permitting free withdrawal of fuel from the container through the nozzle in a reverse direction.

A further object of the invention is a provision in automatic shut-off fuel nozzles, of means for automatically stopping the delivery of fuel from the nozzle upon the nozze becoming dislodged from the filler neck of a container being filled from said nozzle.

Other objects of the invention not specifically enumerated above will appear by reference to the detailed description of the invention hereafter given, and to the appended drawings in which:

Fig. 1 is a side elevation view partly in section of one form of the invention;

Fig. 2 is a top plan view partly in section of the device of Fig. 1;

Fig. 3 is a sectional view taken on line 3—3 of Fig. 2;

Fig. 4 is a cross-sectional view illustrating the shape of the float and taken on line 4—4 of Fig. 2.

Fig. 5 is an end view of the fuel nozzle taken as indicated by line 5—5, Fig. 2.

Fig. 6 is a side elevation view partly in section, illustrating the construction of a second embodiment of the invention. suitable for very high fuel delivery rates;

Fig. 7 is a view to an enlarged scale of the valve operating mechanism illustrated in Fig. 6.

Fig. 8 is a fragmentary isometric view illustrating the details of a Venturi type jet pump employed in the device of Figs. 6 and 7.

Referring now to Fig. 1, the fuel nozzzle in accordance with the invention, is seen to comprise an inlet conduit 1, which communicates with a horizontal cylindrical chamber 2 closed at one end by a removable cover 2a and provided with a removable, annular, fine mesh filter screen 3, the other end of the chamber 2 being provided with a removable wall member 4 having an outlet nozzle 5 formed therein such that fuel entering the conduit portion 1 passes into the chamber portion 2 and through the filter screen 3, issuing in a stream from the nozzle 5.

By reference to Fig. 2, fuel passing from nozzle 5 enters the inlet end of a half-round shaped conduit 6, having a reduced area portion at its entrance end 7 and secured to a transverse wall member 8. The inlet end 7 of the conduit 6 is adapted to serve as a valve seat to cooperate with a flap-type valve member 9 which is mounted on the one end of a lever 10, which is secured intermediate its ends to an operating shaft 11. As illustrated in detail in Fig. 3, the shaft bearings 12 are arranged so that the axis of rotation of shaft 11 is slightly inclined from the vertical and the shaft has its lower end formed into a curved laterally offset portion 11a forming a crank for rotating the shaft to move the valve 9 in either the opening or closing direction. The full line showing of the offset portion 11a (Figs. 1 and 3) correspond to the closed position of valve 9, while the dotted line positions correspond to the open valve position. The conduit 6 is slotted through its side as at 13 (Figs. 2 and 3) to provide for movement of the valve operating lever 10, the outer end of which opposite the valve 9 is connected by means of a link 14 to a half round shaped float 15 (see Fig. 4) preferably made of a low density wood or cork suitably coated with a gasoline-proof coating. The float 15 and conduit 6 are housed within a tubular casing 17 and provided with an end wall 18 suitably apertured at its outer end as at 19 (see also Fig. 5) to support the outer end of the conduit 6 to thereby form a delivery nozzle. The float 15 has a slight operating clearance from the walls of the housing, and is adapted to move in sliding contact with the flat inner wall of the conduit 6. The housing end wall 18 is further apertured as at 20 to allow the free entrance of air or fuel into the housing (see Fig. 5).

As seen in Fig. 1 a finger guard 21 is suitably secured to a suitable flange on the housing 17 and has pivotally mounted therein a spring-pressed lever 22 which is adapted to engage the offset portion 11a of the operating shaft 11 to urge the same to the full line position of Fig. 1, causing the closure of the valve 9. The lever 22 at its lower end is adapted to be retained by a detent slot 23 formed in a lever 24 pivotally mounted intermediate its ends to the guard 21, one end of the lever 24 being urged upwardly by a spring 25 so that the detent slot 23 can engage the lower end of the spring-pressed lever 22 when the same is moved rearward by manual operation of the offset portion 11a of the operating shaft 11. At its other end the lever 24 is provided with the downwardly extending contact portion 26 which projects beyond the guard 21, and adjacent spring 25 lever 24 is connected to a flexible cable 27 which in turn is adapted to be clipped by means of a battery type cable clamp or the like 28 to the filler neck of the container or tank being filled from the nozzle.

*Operation*

In order to operate the nozzle illustrated in Figs. 1 to 5, inclusive, the attendant inserts the same into the filler neck of an airplane gasoline tank or the like and then moves the laterally offset or trigger-like portion 11a of the valve operating shaft 11 to the dotted line position as shown in Fig. 1, which moves the valve 9 to the open position, as seen in Fig. 2, and finally latching the spring-pressed lever 22 in the detent slot 23. Upon opening of the valve 9, fuel issuing from the conduit portion 1 flows through the nozzle 5 as previously explained, into the entrance end 7 of the conduit 6, which, being constricted, causes a Venturi or suction action tending to pump air through the aperture 20 of the housing 17 through the clearance space around the float 15 and into the fuel stream which is finally discharged from the end of the conduit 6, from whence it is discharged into the container. Fuel will continue to be discharged from the nozzle into the container or fuel tank until the level of the fuel has reached the aperture 20 which then blocks further circulation of air through the portion of the housing containing the float 15, and due to the viscosity of the fuel in flowing into the clearance space around the float will produce a considerable suction at the upper end of the float, due to the Venturi action of the flowing fuel, as previously described. The suction or reduction in pressure at the upper end of the float, and the atmospheric pressure exerted on the bottom thereof cause a pressure differential acting on the float, acting as a piston. In addition the immersion of the float in the fuel causes a buoyant force which together with the force due to pressure differential causes the float 15 to move upward and causes the leading edge of the valve 9 to enter the fluid stream issuing from the nozzle 5, and the reaction of the fuel on the valve then causes the same to rapidly close, cutting off the delivery of fuel from the nozzle.

In the event, however, that the rate of delivery of the nozzle is very low, such as two or three gallons per minute, the suction produced above the upper end of the float is insufficient to cause operation of the same as a piston, and, accordingly, the suction produced will cause fuel to enter the housing 17 through aperture 20 and surround the float, and the buoyant force exerted by the fuel on the float will then be sufficient to move the valve 9 into the fluid stream, whereby impact pressure therefrom will cause positive seating of the valve. It is thus seen that the valve 9 is automatically closed to cut off the delivery of fuel from the conduit 6 whenever the level of fuel rises to or slightly above level of the opening 20 in the end wall 18 of the housing 17. The automatic actuation of shut-off valve 9 is sufficiently rapid even under low discharge conditions that only a small quantity of fuel is discharged by the nozzle before the valve is completely closed, thus minimizing any overflow from the tank into which the nozzle is delivering fuel.

In the event, due, for example, to disturbing the hose line connecting the pump to the nozzle, that the latter should become dislodged from the filler neck of the tank into which it is inserted, the nozzle may drop upon a wing or surface adjacent to the tank in such an attitude as to strike the contact portion 26 of the lever 24, thus moving the lever downward an amount sufficient to release the spring-pressed lever 22, allowing the same to move the offset or trigger portion 11a of the valve operating lever 11 to the forward or full line position as shown in Fig. 1, thereby positively moving the valve 9 to the closed or shut-off position.

In the event upon dislodgement of the nozzle that the contact portion 26 of the lever 24 fails to strike any surface adjacent to the tank, the flexible cable 27 which is attached at its outer end by means of the battery clamp 28 to the tank filler neck will due to the weight of the nozzle and hose line pull on the lever 24 and release the spring-pressed lever 22 to cause an automatic shutting off of the valve 9. The flexible cable serves as a ground conductor in addition to its functions as a means for operating the safety release lever 24 to cause the automatic shutting off of the valve.

The form of the invention illustrated in Figs. 1 to 5 inclusive is primarily intended for use with hand- or power-operated dispensing pumps where the delivery rate does not exceed seventy-five gallons per minute, and for high rates of delivery up to, or in excess of, the order of two hundred gallons per minute, the embodiment of the invention illustrated in Figs. 6, 7 and 8 is more suitable.

Referring to Fig. 6, the second embodiment of the invention is seen to include an inlet conduit 30 adapted to be connected to a suitable flexible inlet hose or the like not shown, and the conduit 30 being secured by bolts or the like through a flange thereof to a cylindrical housing 31, the latter having a removable cover 32 and enclosing an annular filter screen 33 through which fuel passes from the housing 31 into an aperture 34 at the front of the housing 31. The aperture 34 communicates with a chamber 35 formed by the interior of an annular housing 36 which is secured by bolts to the front end of the housing 31, and a tubular conduit 37 forming the dispensing nozzle is threadably secured to the outer end of the housing 36. Referring to Figs. 6 and 7, it is seen that an annular conical valve seat 38 is formed in the interior of the housing 36 intermediate its ends and is adapted to cooperate with a poppet-type valve 39 made of a resilient material and serving as a shut-off valve to establish or discontinue flow through the dispensing conduit 37. The valve 39 is carried on a metal core member 40 and is supported by and axially slidable upon a plurality of spider members 41 which are formed integral with a valve stem 42, the spider members being provided with stops to engage the core member to open the valve. The valve core member 40 is provided at its outer periphery with an annular rearwardly extending portion 43 which together with the rear wall of core member 40 forms a piston slidable in a cooperating cylinder 44 which is supported by suitable ribs or the like secured to a front flange portion of the housing 31. The cylinder 44 serves as a guide for the valve 39 and also serves as a dash pot cylinder, being provided with a restricted orifice 45 in its rear wall so that the cylinder becomes filled with fuel and the piston formed by the annular portion 43 and valve core member 40 serve to force fluid from or through orifice 45, which dampens the motion of the valve and serves to prevent hammering and undue shock upon rapid opening and closing of the valve 39.

The valve core member 40 is provided with a central conical valve seat 46 which is adapted to cooperate with a second valve 47 which is mounted upon and movable with the valve stem 42, the movement of the valve 47 being resisted by a compression spring 48 surrounding the valve stem 42 within the cylinder 44 and abutting the rear wall thereof. The valve stem 42 projects through a suitable guide formed in the back wall of the cylinder 44 and is provided with an eye 49 into which the upper end of an actuating lever 50 projects, the lever being pivoted at 51 and having a toe portion 52 through which forces are exerted to move the valve stem 42 against the resistance of spring 48. It will be seen that rearward movement of the valve stem 42 lifts the valve 47 off its seat and permits the equalization of pressure upon both sides of valve 39 so that further movement of the valve stem 42 causes the spiders 41 to positively engage the valve 39 and lift the same off its seat 38 to establish flow through chamber 35 to outlet conduit 37.

Immediately beyond the valve 39 is an inwardly directed annular wall 53 having a central passage 54 therethrough which is adapted to cooperate with a bell-shaped deflector member 55 to serve as a restriction against the flow of fuel coming through the valve 39. The restricting member 55 is provided with a tubular hub 56 which is axially slidable on a stem 57 formed at the outer end of and integral with the valve stem 42. The stem 57 is provided with a radially extending abutment member 59 adjacent its outer end and serves as a seat for the outer end of a tapered compression spring 58 which at its inner end engages the deflector member 55 and urges the same axially to the left toward the aperture or passage 54. Upon opening of the valve 39, fuel flowing therefrom through the passage 54 is restricted by the deflector member 55 and then flows into the chamber portion of the housing 36 in front of the wall 53, which chamber is indicated by reference numeral 60, from whence the fuel flows directly through the dispensing conduit or nozzle 37 to issue from the outer end thereof into the container to be filled.

As best seen in Fig. 8, the wall member 53 adjacent the bottom thereof has integrally formed therewith a pair of spaced housing members 61 having bores 63 to which are threadedly secured nozzles 62, the nozzles having reduced diameter portions such as to leave a clearance space between the outer wall of the nozzle and the bore 63, the nozzles 62 directing fluid into the throat of a Venturi portion 64 at the outer end of the bore 63 which finally terminates in flared passages 65 which communicate with the chamber 60. The nozzles 62 at their inner ends are in communication with the chamber 35 beyond the valve member 39 and the wall 53 diverts a portion of the fuel passing through the valve 39 to flow through the nozzles 62 and through the Venturi 64 to serve as a well-known type of jet pump which produces a suction in passages 66 connecting the bore 63 to a diaphragm chamber 67 (Figs. 6 and 7) formed on the underside of the housing 36.

Referring again to Figs. 6 and 7, the diaphragm chamber 67 is sealed by a flexible diaphragm 68 subject to atmospheric pressure on its underside which is secured by means of a dished cover plate 69 having suitable vent passages 69a and the plate also serving as a guide for an actuating rod 70 secured at its upper end to the diaphragm 68 and the upward movement of the diaphragm being resisted by a compression spring 71 operatively associated with rod 70. The lower end of the actuating rod 70 is formed as a clevis 72 which is pivotally connected as at 73 to one arm 74 of a bell crank lever generally indicated by the reference numeral 75 which is pivotally mounted as at 76 and provided with one or more detent teeth 77 which are adapted to engage with a detent projection 78 of a lever 79 which is pivotally mounted as at 80 and having a toe portion 81 adapted to engage the lower end of a plunger 82. The plunger 82 passes through a spring-pressed packing gland 83 and the upper end of the plunger engages the toe portion 52 of the lever 50. Lever 79 at its lower end is connected as at 84 to a rod 85 which passes through a suitable transverse sleeve 86 in the conduit 36 and terminates in an actuating handle or grip 87 Fig. 6 at its outer end, rearward movement of which causes rotation of the lever 79 about its pivot 80, which in turn causes plunger 82 to rotate lever 50 in a direction to cause rearward movement of valve stem 42 and opening valves 47 and 39 in the manner previously described. Rotation of the lever 79 also causes the detent projection 78 thereof to engage the detent tooth 77 of lever 75 which thus latches lever 79 and prevents closing movement of the valve 39 until the lever 75 has moved the detent tooth 77 out of contact with the detent 78. The lever 75 is connected at its lower end as indicated at 88 to a link member 89 which is in turn rigidly connected to a rod 90 which extends through an annular sleeve 91 formed integral with the inlet conduit 30, the rod 90 at its other end being provided with a manually actuated push button 92 (Fig. 6). By pressing inward on the push button 92, the movement of rod 90 is transmitted through lever 89 to the lever 75 causing the same to move in a counterclockwise sense to release the detent tooth 78 and allowing closure of valves 47 and 39 under the forces exerted by the compression spring 48, thus providing a manual release of the shut-off valve at any time.

At its outer end the lever 89 is connected to a flexible cable 93 which is provided at its outer end with a conventional battery-type clamp 94 which is clipped to the filler neck of an aircraft fuel tank and serves as an electrical ground conductor for the nozzle assembly and also serves as a means for automatically actuating the lever 75 in a direction to release the detent 78 to allow closing movement of the valves 47 and 39, if the nozzle should for any reason become disengaged from the filler neck and fall from the airplane, since the cable 93 will be tensioned upon the nozzle becoming disengaged from the filler neck of the tank being filled.

The diaphragm chamber 67 (Figs. 6 and 7) is connected by means of a conduit 95 to a cylinder 96 positioned within the nozzle conduit 37, the inner end wall 97 of which serves as a valve seat for a resilient disc valve 98 carried upon the inner end of a float member 99 positioned within the cylinder 96, the float being preferably made of a low density wood or cork, impregnated or coated to resist the action of gasoline. The float 99 is freely slidable axially within the cylinder 96 and is of a smaller diameter than the interior of cylinder 96 so as to leave a large clearance therearound for flow of fuel into the cylinder. At its outer end the cylinder 96 is connected to conduit 100 which extends parallel with the nozzle conduit 37 and is provided with a port 101 in the bottom side thereof. A sleeve 102 is externally slidably mounted on the conduit 100 and is provided with an outwardly extending tubular orifice portion 103 which projects into the slot 104 cut through the bottom of the nozzle conduit 37. A flat spring seal member 105 secured to the sleeve 102 prevents the leakage of fuel through the aperture or slot 104. The sleeve 102 has secured thereto an arm 106 which is fixed to the outer end of a rod or stem 107, which at its inner end is rounded as at 108 and adapted to abuttingly contact the outer end of the spindle 57. This arrangement insures that the operator can not slide the sleeve 102 to bring the orifice 103 into register with the port 101 of the conduit 100 unless the main valve 39 is opened by actuation of valve spindle 42. This is done to prevent unintentional registration of port 101 with orifice 103. Whenever the valves 39 and 47 are seated, valve spindle 42 will be in the position as shown in Fig. 7, and the outer end of the stem 57 will contact the inner end 108 of the rod 107 and position the sleeve 102 to the position as shown in Fig. 7 with the nozzle 103 out of register with port 101.

At its outer end the conduit 100 has telescopically mounted therein a conduit 108, the outer end of which is bent over and inserted into a passage 109 (Fig. 6) provided in the side wall of the nozzle conduit 37 adjacent the extreme outer end thereof and provides for the entrance of either air or fuel into the conduit 108.

A removable closure cap 110 (Fig. 6) is provided for closing the outer end of the delivery nozzle when the same is not in use and it is secured to the nozzle assembly by means of a chain 111 and spring 112.

*Operation*

The operation of the automatic nozzle illustrated in Figs. 6 and 7 is as follows:

The operator, to place the nozzle in service, inserts the nozzle conduit 37 thereof into the filler neck of the container to be filled, such as an aircraft fuel tank, and clips the battery clip 94 onto the filler neck. The handle 87 is then clasped and pulled rearward from the position as shown in Fig. 6, causing rotation of the lever 79, the portion 81 thereof acting on plunger 82 to rotate lever 50 in a counterclockwise direction moving valve stem 42 axially to the rear against the compression of spring 48, which action causes valve 47 to open and allow equalization pressure on each side of valve 39, and continued movement of handle 87 causes further movement of valve stem 42 until the spiders 41 engage the valve core member 49 of the valve 39, causing the latter to move to the open position, and in the meantime detent 78 will engage the detent tooth of lever 75 to latch the lever 79 in its rearmost position, leaving valve 39 wide open to establish flow from the nozzle in the manner previously explained. The compression spring 71 urges the lever 75 downward with respect to its pivot 76 maintaining the detent tooth 77 in contact with the detent 78 and thus insuring that the valve will remain locked in the open position.

Upon establishing flow through the valve 39, the baffle wall 53 will divert a portion of the total flow through the Venturi jet pumps 61, creating a suction in diaphragm chamber 67, the Venturi jet pumps discharging into the chamber 60 where the discharge therefrom mingles with the flow passing through the orifice 54. As the pressure is built up through the restricted orifice 54, the deflector member 55 will move axially to the right as seen heretofore, compressing the spring 58 and alowing a maximum flow into the chamber 60 and out through the nozzle 37, but the deflector member 55 creating a sufficient back pressure that sufficient flow will be maintained to the Venturi jet pumps 61, under all rates of nozzle delivery, to produce the necessary vacuum in chamber 67 for operation of the automatic valve releasing mechanism.

As long as the fuel level in the tank being filled does not reach the port 109, air will pass through the conduit 108 into the conduit 100 and through cylinder 96 into conduit 95 and into diaphragm chamber 67 from whence it will pass through the passages 66 into the jet pumps 61, neutralizing the suction produced thereby, so that the diaphragm 68 remains in its lower or inoperative position as shown in Figs. 6 and 7. As soon as the level of fuel, however, reaches port 109, the suction will rapidly pull the fuel into cylinder 96 causing float 99 to move rearward from the position as seen in Fig. 7 so that the valve member 98 cuts off communication between the cylinder 96 and conduit 95. The above action prevents the circulation of air into the diaphragm chamber 67 so that the jet pumps 61 produce a high vacuum of the order of 7 to 9 pounds per square inch in the diaphragm chamber 67, which causes the diaphragm 68 to move upward due to the existence of atmospheric pressure on the underside thereof and moves the actuating rod 70 upward to rotate the lever 75 about its pivot and release the detent 78 from engagement with the detent tooth 77. A release of detent 78 permits spring 48 to move the valve 47, and finally valve 39, to the closed position, and shutting off the delivery of fuel from the nozzle.

As the valve 29 is closed, the dash pot action of piston 40—43 and cylinder 44 in drawing in fuel into the interior of the cylinder through orifice 45 causes the valve 39 to seat gently, avoiding shock and consequent hammering in the fuel pump and line connected thereto.

In the event that at any time the operator desires to manually cut off the flow of fuel from the nozzle, it is only necessary to press on the button 92 on the end of rod 90 (Fig. 6) to thereby shift the lever 75 against the resistance of spring 71 and release detent 78 from engagement with the detent tooth 77 allowing valve 39 to be closed under the influence of spring 48 in the manner as previously described.

In the event the nozzle becomes dislodged from the filler neck of the associated fuel tank, the cable 83 will be tensioned and pull on link 89 to automatically rotate lever 75 to release the detent 78, allowing valve 39 to close under the influence of spring 48.

Where the type of tank is such that the filler neck thereof is short and it is required to fill the tank to a higher level than the level of port 109, the operator, after establishing flow through the nozzle, slides the sleeve 102 rearward from the position as shown in Fig. 6, by pressing his thumb on the tubular orifice 103, and this action will bring the port 101 into register with the orifice 103 so that air may circulate through into the conduit 108 and cylinder 96 even though the fuel level has risen up to the port 109, and fuel can continue to rise until it reaches the level of orifice 103 which then blocks off the circulation of air into the conduit 108 and the suction causes fuel to flow through the orifice 103 into cylinder 96 which causes the float 99 to rise and block the entrance of air into diaphragm chamber 67 causing automatic actuation of valves 47 and 39 in the manner as previously described.

It will be seen by reference to Figs. 6 and 7 that when the valve 39 is released to move to its closed position, the outer end of the stem 57 will strike the end 106 of the rod 107, moving sleeve 102 to the position as shown in these figures and bringing orifice 103 out of register with port 101 so that the nozzle is operative to cut off automatically at the higher fuel level only when so desired by the operator and not unintentionally.

The provision of the float 99 to control operation of the vacuum actuated valve releasing motor (diaphragm 68) constitutes a distinct improvement which permits the present nozzle to be used where delivery rates are as much as 200 gallons per minute. Since the float positively seals the outlet of conduit 95 by means of valve member 98, very high suction is built up in the diaphragm chamber almost immediately which causes very rapid actuation of the shut-off valve so that only a small quantity of fuel issues from the nozzle once the desired level is reached.

It will be noted that in both of the embodiments of the invention, the automatically actuated valves are so arranged that by reversing the operation of the dispensing pump, liquid may be withdrawn from a container through the nozzles, since the valves can be freely moved in the opening direction due to suction, and this feature is of considerable importance since it is necessary to clear the pump lines of fuel where the pumping apparatus is to be carried on the aircraft in order to avoid fire hazard. In the device of Figs. 1 to 5, inclusive, if the valve 9 is seated, reversal of the pump connected to the inlet conduit 1 will cause a reduction in pressure above the valve causing the same to open, permitting a reverse flow through the nozzle and the impact of the fluid stream on the valve will keep the same open against any force due to the float if the same should be immersed. In the device of Figs. 6 to 8, inclusive, reverse flow through the nozzle will cause valves 39 and 47 to lift from their seats due to suction, permitting a flow in the reverse direction through the nozzle, and chamber 67 will be flooded with fuel under pressure and hence, the diaphragm device will be rendered inoperative to cause automatic closure of the valves.

While preferred embodiments of the invention have been illustrated and described, it will be apparent to those skilled in the art that many changes and variations may be made therein falling within the scope of the invention as defined by the appended claims.

We claim:

1. In an automatic shut-off fuel dispensing nozzle having a spout adapted to be inserted into a container to be filled, a valve in said nozzle movable between open and closed positions to establish or cut off delivery through said nozzle, yielding means urging said valve to the closed position, manually actuated means for moving said valve to the open position, a releasable latch cooperating with said manually actuated means to maintain the valve in the open position, a vacuum actuated means connected to said latch to release the same, vacuum producing means associated with said nozzle and responsive to flow therethrough, and float means responsive to the level in fuel in the container being filled reaching a predetermined point with respect to the outlet of said nozzle for rendering said vacuum producing means operative to actuate said vacuum actuated means to release said latch whereby said yielding means moves said valve to the closed position.

2. In an automatic shut-off fuel dispensing nozzle having a spout adapted to be inserted into a container to be filled, a valve in said nozzle movable between open and closed positions, manually actuated means for opening said valve and including a releasable latch for maintaining the valve in the open position, vacuum actuated motor means operatively connected to said latch for releasing the same, a jet pump in said nozzle operatively connected to said motor means, said jet pump being actuated by at least a portion of the flow through said nozzle, means for venting said motor means to atmosphere and float means responsive to the rise in level of fuel in the container being filled above a predetermined point with respect to the outlet of said nozzle spout, said float means being operative to render said venting means ineffective whereby the vacuum motor means becomes operative to actuate said latch means to release said valve to move to the closed position.

3. In an automatic shut-off fuel dispensing nozzle, a spout adapted to be inserted into a container to be filled, a flap valve in said nozzle adapted to be moved to the closed position at least in part by impact of the fluid stream through said nozzle, manual means for opening said valve, a chamber associated with said nozzle, a Venturi jet pump in said nozzle operatively connected to said chamber, a float in said chamber operatively connected to said valve to move the same to the closed position, said float being in the form of a piston movable in said chamber but having a clearance therearound, a vent opening in said chamber communicating with the atmosphere adjacent the outlet of the spout of said nozzle, whereby when the level of fuel in said container reaches said vent opening and fuel is drawn into said chamber, buoyant forces will act on said float and the suction produced in said chamber will cause a difference in pressure on said float acting as a piston, said forces moving said valve in the closing direction.

4. The structure as claimed in claim 3, in which, when the suction produced in said chamber is low due to low delivery from said nozzle, said float is responsive to the rise of liquid into said chamber to move said valve in the closing direction due to buoyant forces exerted on said float by the liquid drawn into said chamber.

5. In an automatic shut-off fuel nozzle, a chamber associated with said nozzle, a Venturi jet pump responsive to flow through said nozzle, a connection between said chamber and said jet pump whereby said pump tends to produce a vacuum in said chamber, a vent opening in said chamber adjacent the outlet of said nozzle, a flap valve in said nozzle, a float-type piston in said chamber operatively connected to said valve, said piston having a clearance space therearound to permit the circulation of air from said vent opening through said chamber, said piston being operative to move said valve in the closing direction upon the entrance of liquid into said vent opening due to pressure difference acting on said piston, and said piston also being effective in response to buoyant forces exerted thereon by liquid drawn into said chamber through said vent opening.

6. In an automatic shut-off fuel dispensing nozzle, a valve for controlling flow through said nozzle, releasable spring-loaded means for moving said valve in the closing direction, normally vented suction responsive means for closing said valve, means for rendering said suction responsive means operative upon the level of fuel being dispensed reaching the outlet of the nozzle, and means responsive to dislodgment of said nozzle from the container being filled for actuating said releasable spring-loaded means to close said valve.

7. In an automatic shut-off fuel dispensing nozzle, a valve for establishing or cutting off the flow of fuel through the nozzle, means for continuously urging said valve in the closing direction, manually actuated latch means for locking said valve in the open position, suction responsive means operatively connected to said latching means for releasing the same, said suction responsive means being energized by flow through said nozzle, float means responsive to the level of fuel in the container being filled reaching the outlet of said nozzle for rendering said suction responsive means effective, manual means for releasing said latching means at any time and means responsive to dislodgment of said nozzle from the container being filled for releasing said latching means.

8. In an automatic shut-off liquid dispensing nozzle, a spring-loaded valve operative to be moved to the open or closed position to respectively establish or cut off flow through said nozzle, means for reliably latching said valve in the open position, a vacuum responsive diaphragm device for releasing said latching means, a Venturi jet pump in said nozzle operatively connected to said diaphragm device, a yielding deflector member for continuously diverting a portion of the fluid passing through said nozzle into said jet pump, a vent passage connecting said diaphragm device to the atmosphere and said passage terminating in an inlet adjacent the outlet of said nozzle, and float actuated valve means in said passage for cutting off the communication of said diaphragm device with the atmosphere, said float actuated valve means being rendered operative upon the entrance of liquid into said vent passage from the inlet thereof.

9. The structure as claimed in claim 8, in which said vent passage is provided with a port positioned above the said inlet of said passage, said port communicating with the atmosphere and preventing operation of said float actuated valve means until the level of liquid has risen to the level of said port, manually controlled means for opening said port and means actuated by said valve for closing said port upon closure of said valve.

10. In a device of the character described, a tubular housing having an inlet, there being a discharge passageway through the housing, a valve shaft extending transversely of the housing bore, a valve on the shaft and movable to and from a position closing said passageway, a float in the housing and connected to the valve for moving it toward closing position when the float rises, a crank on said shaft, said crank being at the exterior of the housing and being operative to rotate the shaft and thereby move the valve to open the passageway, a spring pressed trip member adapted, upon release, to throw the crank in a manner to close the valve, a trigger normally holding the trip member restrained and operable to release it, a cable connected at one end to the trigger, and a clamp member at the free end of the cable, whereby, when the clamp member is clamped to a stationary object, a predetermined extent of bodily movement of the nozzle with respect to the object, pulls the cable and thereby operates the trigger to release the trip member.

11. In an automatic shut-off fuel dispensing nozzle adapted to be inserted in a container to fill the same to a predetermined level, a valve for controlling flow through said nozzle, releasable spring loaded means for moving said valve in the closing direction, said spring loaded means normally having no effect on movement of said valve in either opening or closing direction, means operatively associated with said valve and responsive to the level of fuel being dispensed rising above the outlet of said nozzle for causing said valve to move in the closing direction, and means responsive to dislodgment of the nozzle from the container being filled for releasing said spring loaded means to cause said valve to move in the closing direction.

12. In an automatic shut-off fuel dispensing nozzle adapted to be inserted in a container to fill the same to a predetermined level, a valve for controlling flow through said nozzle, releasable spring loaded means operative to move said valve in the closing direction, a trigger mechanism operative to normally maintain said spring loaded means ineffective to move said valve, means operatively associated with said valve and responsive to the level of fuel being dispensed rising above the outlet of said nozzle for causing said valve to move in the closing direction, and a cable secured at one end to said trigger mechanism and at its free end to the container and effective upon dislodgment of said nozzle from the container to actuate said trigger mechanism to thereby release said spring loaded means to move said valve to the closed position.

DAVID SAMIRAN.
RUDOLPH FINK.

REFERENCES CITED

The following references are of record in the file of this patent:

UNITED STATES PATENTS

| Number | Name | Date |
|---|---|---|
| 2,310,631 | Hansen | Feb. 9, 1943 |
| 2,011,393 | Bradley | Aug. 13, 1935 |
| 1,689,066 | Baxter | Oct. 23, 1928 |
| 1,923,574 | Hansen | Aug. 22, 1933 |
| 1,539,081 | Fritz | May 26, 1925 |
| 328,827 | Ward | Oct. 20, 1885 |

FOREIGN PATENTS

| Number | Country | Date |
|---|---|---|
| 155,998 | Germany | Dec. 15, 1938 |